United States Patent [19]

Mangeruga

[11] Patent Number: 5,009,377
[45] Date of Patent: Apr. 23, 1991

[54] DEBRIS COLLECTION FOR A LAWNMOWER

[76] Inventor: Joseph N. Mangeruga, 168 South Odessa Ave., Egg Harbor, N.J. 08215

[21] Appl. No.: 475,879

[22] Filed: Feb. 6, 1990

[51] Int. Cl.$^5$ ............................................. B65B 67/04
[52] U.S. Cl. .................................. 248/99; 248/231.8; 248/316.7
[58] Field of Search .................. 248/95, 100, 101, 99, 248/231.8, 218.4, 230, 231, 231.2, 231.7, 316.7; 220/404, 1 T; 224/42.46 R, 32 R

[56] References Cited

U.S. PATENT DOCUMENTS

| | | | |
|---|---|---|---|
| 2,455,119 | 11/1948 | Hall | 224/42.46 R X |
| 2,558,372 | 6/1951 | Nidermayer Jr. | 224/42.46 R X |
| 2,635,797 | 4/1953 | Siebert | 224/424.6 R |
| 2,884,174 | 4/1959 | Davitt | 248/95 X |
| 4,202,521 | 5/1980 | Harding . | |
| 4,449,750 | 5/1984 | Pultman | 224/42.46 R X |
| 4,491,257 | 1/1985 | Ingles | 224/44.46 R |
| 4,577,903 | 3/1986 | Wells | 224/42.46 R X |
| 4,646,802 | 3/1987 | Basore et al. . | |
| 4,747,506 | 5/1988 | Stuchlik III. | 248/218.4 X |
| 4,815,764 | 3/1989 | Carpenter | 224/42.46 R X |
| 4,821,988 | 4/1989 | Jimenez | 248/231.8 X |
| 4,871,141 | 10/1989 | Chen | 248/231.8 |

Primary Examiner—Ramon O. Ramirez

[57] ABSTRACT

A debris collection device detachably mounted on the handle structure of a lawnmower. The person operating the mower can place in the collection device any cans, sticks, papers, etc. that he encounters while mowing the lawn. The collection device preferably includes an annular bag- suspension frame having a resilient clip structure extending along one of its edges. The clip structure can be manually snapped onto (or off of) a tubular arm structure that forms part of the handle of a conventional lawnmower.

1 Claim, 1 Drawing Sheet

U.S. Patent    Apr. 23, 1991    5,009,377
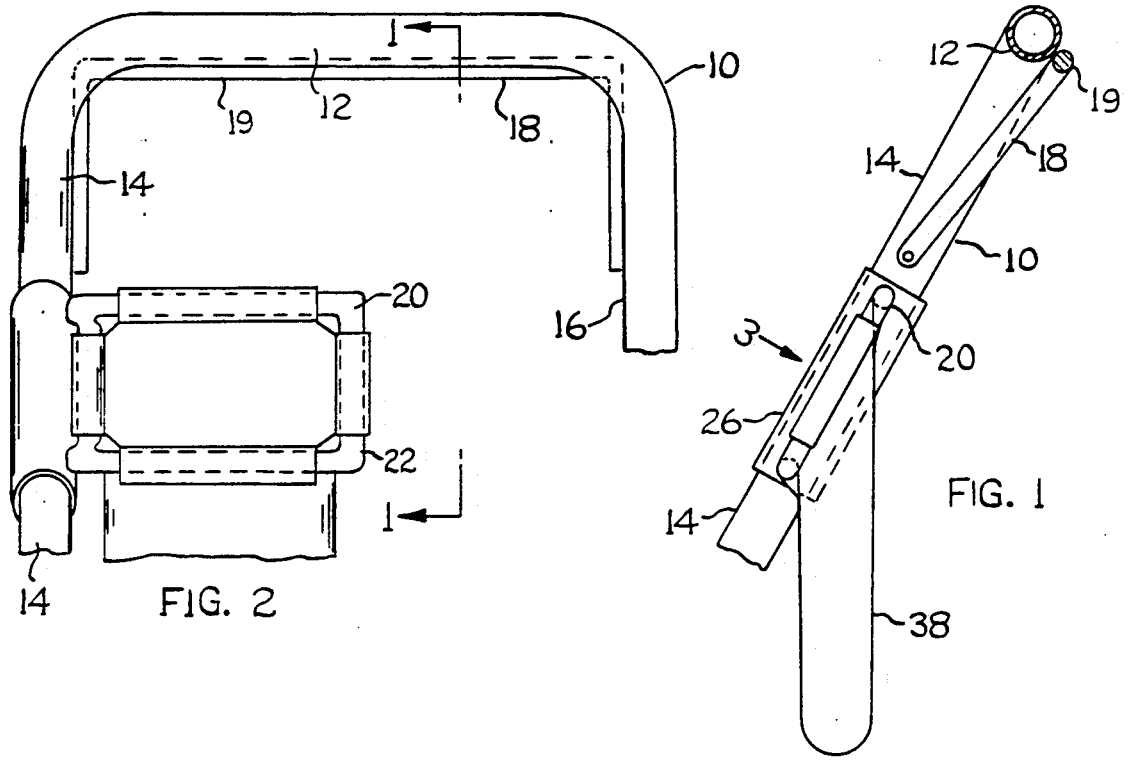
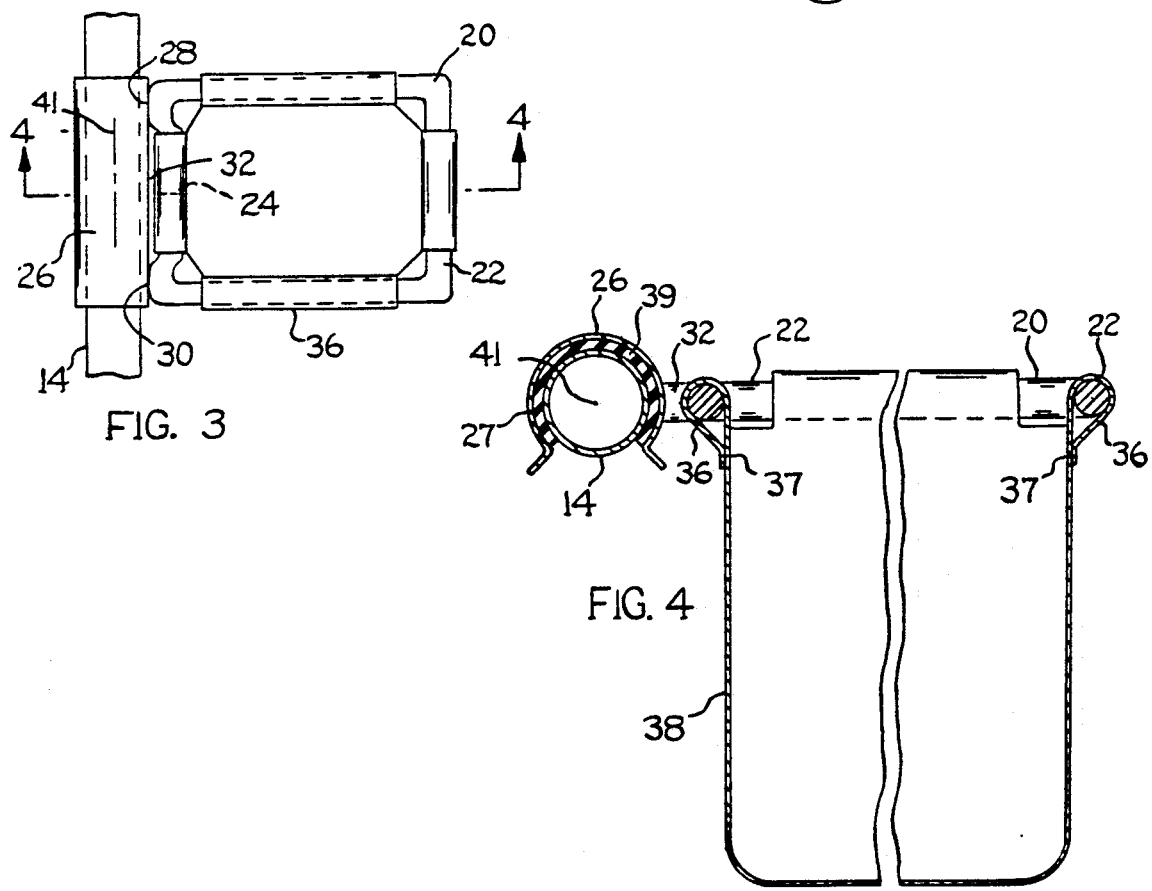

DEBRIS COLLECTION FOR A LAWNMOWER

BACKGROUND AND SUMMARY OF THE INVENTION

This invention relates to a debris collection device attachable to a lawmower so that the person operating the lawmower can readily collect and dispose of paper, small rocks, twigs, cans or other debris that he may encounter on the ground while he is mowing the grass.

Many present day lawmowers are equipped with grass catchers of the closed type, i.e. catchers having a bottom wall, top wall, and interconnecting walls adapted to completely enclose the grass clippings. A person operating a lawnmower equipped with such a catcher has no place to deposit debris that he may encounter during the process of mowing the lawn. He will most often kick the item aside and leave it in place on the ground.

I have devised a small debris collection device that can be attached to the handlle of a conventional lawnmower. When a small rock, weed, soft drink can, etc. is found in the path of the lawnmower the person operating the mower can temporarily stop the mower and pick up the foreign item for placement in the debris collection device. The debris collection device can later be emptied when the grass catcher is emptied.

The debris collection device preferably comprises a small rectangular frame adapted to suspend a collection bag behind the handle of a lawnmower. The bag suspension frame has a resilient clip structure extending therealong for snap-on installation over an upstanding tubular arm that forms part of the handle structure for the lawnmower. The clip structure can be manipulated to readily snap on or off of the tubular arm, e.g. when it is necessary to empty the bag.

THE DRAWINGS

FIG. 1 is a fragmentary sectional view through the handle of a lawnmower having a debris collection device of the present invention installed thereon.

FIG. 2 is a front view of the FIG. 1 structure.

FIG. 3 is a top plan view of the debris collection device shown in FIG. 1. FIG. 3 is taken in the direction of arrow 3 in FIG. 1.

FIG. 4 is a sectional view taken on line 4—4 in FIG. 3.

DESCRIPTION OF A PREFERRED EMBODIMENT OF THE INVENTION

FIG. 1 fragmentarily shows the handle structure 10 of a conventional lawnmower. The handle structure includes a horizontal handgrip section 12 and two angularly extending arm sections 14 and 16. The lower ends of arms 14 and 16 (not shown) connect to the main blade housing of the lawnmower. Handgrip section 12 is elevated above the ground so as to be approximately at waist level. The person operating the mower will be located behind the handle structure, with his hands extending around handgrip section 12. A deadman control lever 18 is pivotably connected to tubular arms 14 and 16, such that the person is required to extend at least one of his hands around section 19 of the deadman control in order to keep the mower running.

My invention relates to a debris collection device 20 attached to one of the tubular arms 14 or 16. The collection device comprises an annular rectangular frame 22 formed out of a steel rod. Numeral 24 references the ends of the rod. A resilient clip means 26 is attached to frame 22, via welds at frame corner areas 28 and 30. The leg of frame 20 between corner areas 28 and 30 is offset away from the surface of clip means 26 to form a slot 32 that is adapted to accomodate flap portion 36 of a flexible bag 38.

Bag 38 has four flap portions 36 adapted to extend around portions of frame 20 as shown generally in FIG. 4. The ends of flap portions 36 may be stitched to the bag wall, as at 37, for suspending the bag from frame 20.

Resilient clip means 26 comprises a circularly curved sheet 27 of spring metal. The radius of curvature of curved sheet 27 is slightly less than the radius of curvature of the tubular arm 14 cross section, when sheet 27 is in its free unstressed condition. The interior concave surface of sheet 27 has a soft elastomeric lining 39 adhesively secured thereon. When the resilient clip means is snapped over the circularly cross sectioned arm 14, as shown in FIG. 4, the resilient elastomeric lining 39 grips the curved surface of arm 14 to prevent the clip-frame assembly from gravitationally turning around the axis 41 of arm 14. Spring sheet 27 exerts a clamp force that maintains and enhances the grip of soft rubber element 39 on the surface of arm 14.

It is possible to have the debris collection device extend entirely across the space between arms 14 and 16 of the lawnmower handle structure. If frame 20 of the collection device was lengthened to span the entire distance between arms 14 and 16 a resilient clip means could be provided at each end of the elongated frame to provide an enhanced support action. However, in many cases tubular arm 16 of the lawnmower handle is obstructed, due to the presence of a throttle speed control device thereon. The speed control device commonly comprises a small housing attached to tubular arm 16 to mount a manual lever operator for a Bowden wire throttle control linkage.

When tubular arm 16 is so obstructed that it cannot accept a second resilient clip structure 26 then bag-suspension frame 20 can be supported from arm 14 by the single resilient clip means 26 shown in FIG. 4.

The illustrated debris collection device is relatively inexpensive to manufacture. Additionally the collection device is easily installed on the lawnmower handle or removed from the lawnmower handle. Clip means 26 and frame 20 preferably extend in the same general plane as arm 14, as seen in FIG. 1. With such an arrangement the frame can be firmly attached to the clip means at frame corners 28 and 30, without any intervening connector devices between the frame and the clip means. The mouth of the suspended bag is angled, as shown in FIG. 1. However, such an angulation does not significantly detract from the usefullness of the bag. It is still possible to deposit debris into the bag. The collection device is relatively light such that it can be adequately supported by a single resilient clip means 26.

The drawings necessarily show one form that the invention can take. However, the invention can be practiced in other forms and configurations.

What is claimed is:

1. A debris collection device attachable to an inclined circular cross-sectioned handle element of a lawnmower: said collection device comprising an endless annular frame consisting of a rod bent into a rectangular configuration to form four rod sections connected at right angles to each other; a flexible bag having four flap portions (36) looped over and around the four rod sections whereby the bag is suspended from the annular frame; one of said rod sections having an intermediate portion thereof offset from the corners at the ends of said one rod section; a resilient clip means attached to said annular frame for partial encirclement around an inclined handle element of a lawnmower; said resilient clip means comprising a single circularly curved metal sheet extending along said one rod section in the plane of the annular frame; said curved metal sheet being welded to the corners at the ends of said one rod section whereby a slot (32) is formed between said curved metal sheet and the intermediate portion of said one rod section; one of said flap portions extending over the intermediate portion of said one rod section and through said slot; and an elastomeric lining on the interior surface of the resilient curved metal sheet, whereby said elastomeric lining is enabled to frictionally grip the circular cross-sectioned surface of an inclined handle element of a lawnmower.

* * * * *